United States Patent [19]

George

[11] Patent Number: 5,227,437
[45] Date of Patent: Jul. 13, 1993

[54] ISOMORPHIC POLYKETONE POLYMER BLEND

[75] Inventor: Eric R. George, Houston, Tex.

[73] Assignee: Shell Oil Company, Houston, Tex.

[21] Appl. No.: 775,381

[22] Filed: Oct. 15, 1991

[51] Int. Cl.$^5$ .............................................. C08G 67/02
[52] U.S. Cl. ...................................... 525/539; 528/392
[58] Field of Search ......................... 525/539; 528/392

[56] References Cited

U.S. PATENT DOCUMENTS

| 4,609,714 | 9/1986 | Harris et al. | 525/471 |
| 4,778,876 | 10/1988 | Doyle et al. | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |

Primary Examiner—James J. Seidleck
Assistant Examiner—Thomas Hamilton, III
Attorney, Agent, or Firm—Denise Y. Wolfs

[57] ABSTRACT

Improved compositions comprise isomorphic polymer blends of at least two linear alternating polymers of carbon monoxide and one or more ethylenically unsaturated hydrocarbons. A preferred composition is the combination of a linear alternating polyketone copolymer of carbon monoxide and ethylene with a linear alternating polyketone terpolymer of carbon monoxide, ethylene, and a second ethylenically unsaturated hydrocarbon of at least 3 carbon atoms, particularly propylene.

13 Claims, No Drawings

ISOMORPHIC POLYKETONE POLYMER BLEND

FIELD OF THE INVENTION

This invention relates to polyketone polymer blends, and, more particularly, to miscible blends of a polyketone copolymer with a polyketone terpolymer that exhibit isomorphism in the molded state.

BACKGROUND OF THE INVENTION

Polyketone polymers are semi-crystalline polymers which possess an attractive set of properties for a variety of applications. The utility of these polymers can be further broadened by selectively blending polyketone polymers with other materials which have complimentary property sets.

The mixing together of two or more polymers has attracted interest as a means of arriving at new property combinations without the need to synthesize novel structures. The most common polymer blends are immiscible. In most cases, when two polymers are mixed, the components tend to segregate into separate phases, forming a non-adhering, heterogeneous mixture that exhibits inferior overall properties.

However, on rare occasions, polymer pairs will form miscible blends. The term miscible describes a mixture of two or more polymers that form a single-phase solution (solid or liquid) within the amorphous phase on a molecular scale. When one or both of the polymer blend components is capable of forming both a crystalline and an amorphous phase (i.e. a semicrystalline polymer), then the term miscible refers only to the amorphous phase in which the separate components are capable of mixing on the molecular level. Miscibility is indicated by a single glass transition temperature for a blend of two or more components.

Blends which exhibit isomorphism are even more rare than miscible blends. The term isomorphic will be used herein to describe a mixture of two or more polymers that co-crystallize, exhibiting only one crystallization point temperature (and also, only one melting point temperature). Isomorphic polymer pairs form both a miscible blend in the melt and cocrystallize when converted to the solid state.

Examples of isomorphic polymer pairs include aromatic polyetherketone polymer pairs and binary blends of copolymers of vinylidene fluoride and trifluoroethylene. U.S. Pat. No. 4,609,714 (Harris et al.), incorporated herein by reference, discloses isomorphic poly(aryl ether) resin pairs and also provides a description of isomorphism. Isomorphic polymer systems require the different types of monomer units to have approximately the same shape and volume (to allow co-crystallization), and to have a chemical attraction that promotes miscibility in the melt phase.

It is an object of this invention to provide an isomorphic blend of two or more polyketone polymers.

SUMMARY OF THE INVENTION

The invention provides an isomorphic blend comprising at least two separately made linear alternating polyketone polymers, each having a different crystallization point and melting point temperature prior to their combination, formed into an intricate moldable mixture. The blends exhibit a single crystallization temperature and a single melting point temperature, indicative of the rare quality of isomorphism in the molded state. The blends posses a broader range of use temperatures than the unblended polymers. A preferred blend is the combination of a linear alternating polyketone copolymer of carbon monoxide and ethylene with a linear alternating polyketone terpolymer of carbon monoxide, ethylene, and a second ethylenically unsaturated hydrocarbon of at least 3 carbon atoms, particularly propylene. The invention also provides a method of increasing the crystallization temperature of a polyketone terpolymer by incorporating therein a polyketone copolymer. Concurrently, the invention also provides a method of increasing the melting point of a polyketone terpolymer, thereby increasing its use temperature, by incorporating therein a polyketone copolymer. Articles manufactured from the isomorphic blends are also within the scope of the invention.

DETAILED DESCRIPTION OF THE INVENTION

It has been found in accordance with this invention that an isomorphic polyketone polymer blend can be obtained by blending together a polyketone copolymer with a polyketone terpolymer, particularly a copolymer of ethylene and carbon monoxide with a terpolymer of ethylene, propylene, and carbon monoxide. As used herein, the term copolymer shall mean a polymer of two monomer units (such as ethylene and carbon monoxide), and the term terpolymer shall mean a polymer of three monomer units (such as ethylene, propylene, and carbon monoxide).

A criterion useful for identifying isomorphism, as used herein, is the existence of a single crystallization temperature for a given polymer blend, rather than two separate crystallization temperatures for the two blend components. This parameter is relatively easy to measure using differential scanning calorimetry (DSC) techniques. When the crystalline structure is very uniform, crystallization will occur over a very narrow temperature range, and a sharp crystallization peak will be observed in the DSC data. As the relative proportion of components changes, a smooth transition between the crystallization temperatures for each of the pure blend components and the crystallization temperatures for the various blends will be observed. The existence of a single melting point temperature for a given polymer blend may be similarly used to indicate an isomorphic polymer blend.

Isomorphic blends possess a broader range of use temperatures than the unblended polymers. Isomorphic polymer blends can be used to make molded parts at temperatures above the melting point of the polymer with the lower melting point, yet below the melting point of the polymer with the higher melting point. Since the blend is isomorphic, it exhibits only one melting point for the blend, rather than two separate melting points (one for each component of the blend). The resulting elevation in the melting point for the lower melting point polymer allows its use in parts requiring a higher use temperature. Concurrently with the increase in melting point, the crystallization temperature of the polymer with a lower crystallization point is elevated by the combination with a polymer with a higher crystallization temperature. The isomorphic blend crystallizes at a higher temperature, allowing shorter cycle times and reduced energy costs for the manufacture of molded parts.

For the isomorphic polyketone polymer blends of the invention, it has been found that the addition of from about 20 wt % to about 50 wt %, and preferably about 25 to about 35 wt %, of a polyketone copolymer to a polyketone terpolymer increases both the crystallization point and the melting point temperatures of a polyketone terpolymer up to about the crystallization point and melting point temperatures of the polyketone copolymer. Preferably, the polyketone copolymer is a polymer of carbon monoxide and ethylene, and the polyketone terpolymer is preferably a polymer of carbon monoxide, ethylene, and propylene.

The polyketone polymers of the blends of the invention are of a linear alternating structure and contain substantially one molecule of carbon monoxide for each molecule of unsaturated hydrocarbon. Suitable ethylenically unsaturated hydrocarbons for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene. The preferred polyketone polymer blend components are copolymers of carbon monoxide and ethylene, and terpolymers of carbon monoxide, ethylene and a second ethylenically unsaturated hydrocarbon of at least 3 carbon atoms, particularly propylene.

The polyketone terpolymers include within the terpolymer at least about 2 units incorporating a monomer of ethylene for each unit incorporating a monomer of the second ethylenically unsaturated hydrocarbon. Preferably, there will be from about 10 units to about 100 units incorporating a monomer of ethylene for each unit incorporating a monomer of the second hydrocarbon. The polymer chain of the polyketone terpolymers is therefore represented by the repeating formula

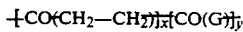

wherein G is the monomer of ethylenically unsaturated hydrocarbon of at least 3 carbon atoms polymerized through the ethylenic unsaturation and the ratio of y:x is no more than about 0.5. The —CO+CH$_2$CH$_2$)—units and the —CO(G)—units are found randomly throughout the polymer chain, and preferred ratios of y:x are from about 0.01 to about 0.1.

The copolymers of carbon monoxide and ethylene that are employed in the blends of the invention are represented by the above formula wherein y is zero. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6 and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis[di(2-methoxyphenyl)phosphino]propane or 1,3-bis(diphenylphosphino)propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the copolymer.

The method of producing the blends of the invention is not material so long as an isomorphic blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped articles. Illustrative applications are the production of articles useful in both rigid and flexible packaging, both internal and external parts for the automotive industry, and structural parts for the construction industry.

The invention is further illustrated by the following Examples which should not be regarded as limiting.

EXAMPLE 1

A linear alternating terpolymer of carbon monoxide, ethylene, and propylene (89/068) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Irganox 1076 and 0.5% Nucrel, both conventional additives.

EXAMPLE 2

A linear alternating copolymer of carbon monoxide and ethylene (89/089) was produced in the presence of a catalyst composition formed from palladium acetate, trifluoroacetic acid and 1,3-bis[di(2-methoxyphenyl)-phosphino]propane. The polyketone polymer had a melting point of about 250° C. and an LVN of about 1.6 dl/g when measured in m-cresol at 60° C. The polyketone polymer also contained 0.5% Irganox 1076 and 0.5% Nucrel, both conventional additives.

EXAMPLE 3

Blends of the polyketone terpolymer of Example 1 and the polyketone copolymer of Example 2 were prepared by compounding the polymers on a 30 mm corotating twin screw extruder at a melt temperature of 265° C. The extruded nibs were evaluated for melting and crystallization temperatures in a Perkin Elmer differential scanning calorimeter (DSC) operated at a 10° C./minute heating and cooling rate. Samples were also injection molded into family test specimens and evaluated for tensile strength, flexural modulus, notched Izod impact, low temperature Gardner impact, and heat deflection temperature (at 264 psi). All samples were tested dry as molded.

The isomorphism of the blends is demonstrated by the melting and crystallization temperatures for the polymer blends, as shown in Tables 1 and 2. The peak temperatures shown are those that would commonly be reported as the melting point or crystallization point temperatures.

TABLE 1

| Terpolymer (wt %) | Copolymer (wt %) | Melting Temperature (°C.) | | |
|---|---|---|---|---|
| | | Onset | Peak | Complete |
| 100 | 0 | 157 | 216 | 230 |
| 90 | 10 | 146 | 219 | 241 |
| 70 | 30 | 161 | 246 | 252 |
| 50 | 50 | 171 | 249 | 255 |
| 30 | 70 | 199 | 249 | 256 |
| 10 | 90 | 206 | 250 | 255 |
| 0 | 100 | 205 | 249 | 256 |

TABLE 2

| Terpolymer (wt %) | Copolymer (wt %) | Crystallization Temperature (°C.) | | |
|---|---|---|---|---|
| | | Onset | Peak | Complete |
| 100 | 0 | 141 | 175 | 192 |
| 90 | 10 | 131 | 182 | 197 |
| 70 | 30 | 131 | 190 | 207 |
| 50 | 50 | 140 | 195 | 211 |
| 30 | 70 | 153 | 199 | 211 |
| 10 | 90 | 114 | 201 | 212 |
| 0 | 100 | 134 | 197 | 210 |

The peak melting temperatures of all blends containing 30 wt % or more of the copolymer exceeded values that would be predicted from the linear rule of mixtures or that predicted by equilibrium thermodynamics. The blends containing from 30 wt % to 90 wt % copolymer all exhibited melting temperatures similar to that of the 100 wt % copolymer.

The peak crystallization temperatures of all of the blends exceeded values that would be predicted from a linear rule of mixtures or from equilibrium thermodyamics. Again, the blends containing from 30 wt % to 90 wt % copolymer all exhibited crystallization temperatures similar to that of the 100 wt % copolymer.

The results of mechanical and thermal property tests are shown in Table 3. The results for these parameters generally follow a rule of mixtures for the two blend components. Notched Izod impact for the copolymer was similar to that for the terpolymer, yet the 30/70, 50/50, and 70/30 blends exhibited slightly higher notched Izod impact resistance than such values for the neat copolymer or terpolymer. Gardner impacts varied but were good for all samples. Heat deflection temperature followed an approximate rule of mixture behavior.

The results in Table 3 indicate that the copolymer exhibits a superior balance of properties, including higher strength and stiffness. There may be applications where better flexibility is required, and this could be achieved by blends of the copolymer with the terpolymer.

TABLE 3

| Terpolymer (wt %) | Copolymer (wt %) | Tensile Strength (psi) | Flexural Modulus (psi) | Room Temperature Notched Izod (ft-lbs/in) | Low Temperature (−30° C.) Gardner Impact (in-lb) | Heat Deflection Temperature (°C.) |
|---|---|---|---|---|---|---|
| 100 | 0 | 8195 | 232,000 | 4.7 | 96 | 83 |
| 90 | 10 | 8438 | 246,000 | 4.4 | 62 | 85 |
| 70 | 30 | 8791 | 253,000 | 5.1 | 95 | — |
| 50 | 50 | 9459 | 275,000 | 5.3 | 73 | 105 |
| 30 | 70 | 9847 | 281,000 | 5.3 | 214 | 102 |
| 10 | 90 | 10,550 | 313,000 | 4.8 | 195 | 137 |
| 0 | 100 | 11,073 | 344,000 | 4.7 | 228 | 170 |

What is claimed is:

1. An isomorphic polymer blend composition comprising two separately made linear alternating polyketone polymers, each separately made polymer having a different crystallization temperature, wherein the first polyketone polymer is a linear alternating polyketone copolymer of carbon monoxide and ethylene, present in an amount from about 20 wt % to about 50 wt %, based on total blend, and the second polyketone polymer is a linear alternating polyketone terpolymer of carbon monoxide, ethylene, and propylene, and wherein the two polymers are combined into an intimate moldable mixture which exhibits co-crystallization.

2. The composition of claim 1 wherein the second linear alternating polymer is represented by the repeating formula

wherein G is a monomer of propylene polymerized through the ethylenic unsaturation and the ratio of y:x is no more than about 0.5.

3. The composition of claim 2 wherein the amount of linear alternating polyketone copolymer of carbon monoxide and ethylene is from about 25 wt % to about 35 wt %, based on total blend.

4. The composition of claim 2 wherein the amount of linear alternating polyketone copolymer of carbon monoxide and ethylene is about 30 wt %, based on total blend.

5. A method of increasing the crystallization point temperature of a linear alternating polyketone terpolymer of carbon monoxide, ethylene, and propylene, by incorporating therein from about 10 wt % to about 9 wt % of a linear alternating polyketone copolymer of carbon monoxide and ethylene, based on total blend.

6. The method of claim 5 wherein the amount of linear alternating polyketone copolymer of carbon monoxide and ethylene is from about 20 wt % to about 50 wt %, based on total blend.

7. The method of claim 5 wherein the amount of linear alternating polyketone copolymer of carbon monoxide and ethylene is from about 25 wt % to about 35 wt %, based on total blend.

8. The method of claim 5 wherein the amount of linear alternating polyketone copolymer of carbon monoxide and ethylene is about 30 wt %, based on total blend.

9. A method of increasing the melting point temperature of a linear alternating polyketone terpolymer of carbon monoxide, ethylene, and propylene, by incorporating therein from about 10 wt % to about 90 wt % of a linear alternating polyketone copolymer of carbon monoxide and ethylene, based on total blend.

10. The method of claim 9 wherein the amount of linear alternating polyketone copolymer of carbon monoxide and ethylene is from about 20 wt % to about 50 wt %, based on total blend.

11. The method of claim 9 wherein the amount of linear alternating polyketone copolymer of carbon monoxide and ethylene is from about 25 wt % to about 35 wt %, based on total blend.

12. An article manufactured from the polymer blend composition of claim 1.

13. The method of claim 9 wherein the amount of linear alternating polyketone copolymer of carbon monoxide and ethylene is about 30 wt %, based on total blend.

* * * * *